United States Patent Office 2,925,392
Patented Feb. 16, 1960

2,925,392

CATALYST AND PREPARATION THEREOF

Charles W. Seelbach, Cranford, and William John Gilbert McCulloch, Plainfield, N.J., assignors to Esso Research and Engineering Company, a corporation of Delaware No Drawing. Application April 2, 1956
Serial No. 575,330

7 Claims. (Cl. 252—429)

This invention relates to the preparation of a novel type of catalyst, and to special methods of preparing same and using it for various chemical reactions.

The invention may be typified by preparing the catalyst according to the following chemical reactions:

$$3TiCl_4 + Ti \rightarrow 4TiCl_3$$

preferably using such proportions and reaction conditions to maintain a small excess of free unreacted titanium, and then reacting the resulting catalyst with an organic metal compound such as aluminum-triethyl. The resulting catalyst is found exceedingly effective for carrying out the polymerization of unsaturated compounds, particularly alpha olefins such as propylene.

TiCl₃ is known to exist in several forms. For instance, if TiCl₄ is reacted with hydrogen in the presence of a solid electric discharge, TiCl₃ is produced in a brown amorphous form. Also, it is known that this brown amorphous TiCl₃ may be converted by heating at 200° C. to produce a violet-colored crystalline form of TiCl₃. It is also known that at very high temperatures such as 400–470° C., TiCl₃ may disproportionate into TiCl₂ and TiCl₄. It has also been disclosed in the literature that some TiCl₃ may be made according to the equation $3TiCl_4 + Ti \rightarrow 4TiCl_3$ by heating a mixture of the Ti powder with liquid TiCl₄ in a closed tube at 250° C. All of the above methods make products which differ from each other physically and chemically.

According to the present invention, a still further modification is used to prepare the TiCl₃, namely by heating to a substantially higher temperature in the range of 350–600° C., preferably about 400–500° C. The pressure may be from about 5 to 100 atmospheres, preferably about 10 to 50 atmospheres, and the time of reaction may be varied from about 1 hour to 1,000 hours, preferably about 10 to 500 hours. Both the pressure and time vary inversely according to the temperature used. The reaction is preferably carried out in a suitable pressure vessel such as an autoclave, and this is preferably provided with means for agitation during the reaction.

The proportions of materials to be used may vary as desired, within the approximate limits of about 0.5 to 2.0 mols, preferably about 0.8 to 1.5 mols of Ti, per 3 mols of TiCl₄, and the reaction is either carried out to the complete reaction of all of the Ti, or preferably only to such extent as to leave an excess of titanium in the range of 0.1 to 1.0 mol of titanium per 4 mols of TiCl₃.

After the reaction has been carried out to the desired extent, the reaction vessel is cooled and the reaction mass, which is essentially a granular solid mass which may contain some free unreacted titanium chloride liquid, and some free titanium powder, or titanium atoms, is preferably filtered to remove any TiCl₄ liquid, and then washed with a suitable inert liquid such as normal heptane.

The resultant high temperature metal reduction product of the reducible titanium chloride, is then preferably ground to a powder, or otherwise comminuted, to a suitable state of fineness, e.g. preferably finer than 20 mesh per linear inch, and preferably between about 100 mesh and 500 mesh. The resulting powder is then added to about 5–100 parts by weight of a suitable liquid such as normal heptane, and it is activated by addition of an organo-metal compound, such as aluminum triethyl, or aluminum diethyl monochloride, preferably added in solution in a similar solvent such as normal heptane. In effecting this activation, an Al/Ti molar ratio of 0.1 to 10.0 may be used, preferably about 1–5, e.g. 1–5 mols of aluminum triethyl per mol of high temperature Ti- reduction product of TiCl₄, calculated as if it were TiCl₃, though it may contain some free or only partially combined Ti. Catalyst slurry may be then either used directly for promoting various chemical reactions such as polymerization of unsaturated compounds, e.g. propylene and so forth, or, if desired the catalyst slurry may be agitated for a period of time of from 1 min. to an hour or so, at room temperature or slightly elevated temperature, e.g. 20–60° C.

These catalysts may be used for catalyzing or promoting other chemical reactions, such as alkylation, isomerization, etc.

The principles of this invention may be applied not only to the reduction of TiCl₄ to TiCl₃, but also the further reduction of TiCl₃ to TiCl₂ according to the equation $$2TiCl_3 + Ti \rightarrow 3TiCl_2$$

Or else the TiCl₄ may be reduced directly to TiCl₂ according to the equation $$TiCl_4 + Ti \rightarrow 2TiCl_2$$

In each case, however, it is preferable to use a sufficient excess of the titanium to have about 0.1 to 1.0 mol of titanium present in the final product per mol of the reduced titanium chloride. As an additional guide in carrying out this invention, it may be stated that regardless of the number of chlorine atoms present in the starting titanium chloride, and regardless of the proportions of titanium chloride and titanium used, it is preferable that the final reduced product contain an excess of about 1–25%, preferably about 1–50%, preferably about 5–25% of titanium, by weight.

In carrying out this invention, it is possible to use other titanium halides or other titanium compounds such as TiBr₄, TiCl₂(OCl)₂, titanium acetyl acetonate, hydrated oxide, alcoholates, etc., or mixed compounds such as TiCl₂(OCH₃)₂. Also, more broadly, the invention may be applied by using in place of titanium compounds, corresponding compounds of other transition metals of groups IV(b), V(b) and VI(b) of the periodic table, including for instance Zr, Hf, V, Nb, Ta, Cr, Mo and W. Certain other transition heavy metals of groups VII(b) and VIII may be used such as manganese and iron compounds.

The catalysts of the present invention comprise a major proportion of an at least partially reduced metal compound of a transition heavy metal of groups IV(b), V(b), VI(b), VII(b) and VIII of the periodic table, and a minor proportion of a free or substantially unreacted metal chosen from the above groups. The partially reduced metal compound of a transition heavy metal of groups IV(b), V(b), VI(b), VII and VIII of the periodic table is a transition heavy metal compound wherein the transition heavy metal is present as the cationic component of the compound and is in a lower valence state than its highest possible oxidized valence state.

Instead of using individual compounds, one may use mixtures of two or more different materials such as $TiCl_4$ and $ZrCl_4$, and it is not necessary that the metal used for reducing the $TiCl_4$ be titanium, but may be any one of the other heavy metals listed above, or mixtures thereof.

The organo-metal compound to be used in activating the reduced heavy metal halide may be an aluminum trialkyl, which may have 1 to 20 carbon atoms, preferably 2 to 12 carbon atoms in the alkyl groups, and these alkyl groups may be either like or unlike; or one may use various aluminum dialkyl mono-halides, e.g. aluminum diethyl mono-chloride, aluminum diethyl mono-bromide, aluminum dimethyl monochloride; or other substituted aluminum alkyl compounds such as aluminum dimethyl methoxy; or various other derivatives having the general formula $AlR_2X$, where X may be a secondary amine, acid amide, mercaptan, thiophenol, carboxylic acid, etc.; or, more broadly, one may use other reducing compounds of metals of the second and third groups of the periodic table such as zinc and magnesium hydrocarbon halides, or zinc and magnesium dialkyls, or corresponding aryl compounds, or any of these compounds together with an alkali metal or alloy, or an alkali metal hydride.

In preparing catalysts according to this invention, all steps should be carried out in the absence of moisture, and preferably also in the absence of oxygen or other harmful impurities. This may be done readily by blanketing the materials with an inert gas such as nitrogen. The raw materials, i.e. both the reactants and inert liquids, etc. may be preferably purified or otherwise treated to remove traces of moisture, oxygen or other impurities.

The details and advantages of the invention will be better understood by a consideration of the following experimental data, which are given for the sake of illustration but without intention of limiting the invention to the specific materials and conditions.

Example I.—Titanium powder (12.5 grams containing 20% added moisture) is heated in a 300 ml. Aminco microbomb to vaporize the moisture which is vented with nitrogen. The bomb is heated to 100° C. for 2 hours, 150° C. for 1 hour and 190° C. for 60 hours. The pressure increased from 0 p.s.i.g. to 120 p.s.i.g. during the first two hours. The bomb is vented and then filled with nitrogen at 100 p.s.i.g. and vented three times. This flushing procedure is repeated at each stage in the heating. The bomb is cooled, opened in a nitrogen atmosphere and 100 grams of $TiCl_4$ (58 ml) is added. The bomb is sealed in the nitrogen atmosphere, placed in a rocker and heated to 400° C. for 48 hours with shaking. The bomb is opened in a nitrogen atmosphere. The product is placed in a sintered glass filter funnel, the unreacted $TiCl_4$ filtered off and the purple solid washed three times with dry n-heptane. This solid is partially soluble in isopropanol giving a blue solution. Addition of water to this solution results in violent gas evolution and loss of color. A small amount of black powder is insoluble. This is unreacted titanium powder.

X-ray analysis shows that this purple solid is primarily crystalline $TiCl_3$ with a small amount (approximately 15%) of unreacted titanium powder. The crystal structure of this $TiCl_3$ is rhombohedral, and it is believed that in this configuration each metal ion is surrounded by six chlorine atoms (coordination number of the metal is six) and each chlorine atom is in turn shared by two metal ions except for the surface chlorine atoms, which are believed to provide a special activating influence on the surface of the solid catalyst particles, particularly after further activation by the addition of aluminum triethyl or other organo-metal compound. In the preferred embodiment of this invention, the presence of excess Ti atoms have an additional activating effect at the surface of the solid catalyst particles, and it is believed that the presence of the excess titanium is in some manner responsible for the very much better catalyst efficiencies (grams of polymer per gram of catalyst) obtained than when using plain $TiCl_3$ without excess Ti, or by using $TiCl_3$ made by some other process than the high temperature reduction of $TiCl_4$ by Ti powder.

Example II.—0.5 grams of the crystalline violet $TiCl_3$ prepared in Example I, and containing approximately 15% of unreacted Ti powder, is ground to a powder with mortar and pestle in a nitrogen atmosphere and transferred to a large test tube containing 50 ml. (34 grams) of dry n-heptane. To this mixture is added 10 ml. of an 0.876 molar solution of Al triethyl in n-heptane, containing about 1 gram of aluminum triethyl. The mixture is agitated thoroughly, and the resulting slurry is then ready for use as a catalyst. The Al/Ti molar ratio of this mixture is about 2.8/1.

This catalyst was added to a 300 ml. microbomb, followed by injection of 120 grams of cold liquid propylene, and polymerization effected at 84° C. and 400–600 p.s.i.g. for 20 hours. Solid polypropylene was obtained.

Example III.—1.8 grams of the crystalline $TiCl_3$ made in Example I, is pulverized and slurried in 20 ml. of dry n-heptane, and then mixed with 20 ml. of 0.876 molar aluminum triethyl and 10 ml. of 0.876 molar aluminum diethyl mono-chloride, and additional dry n-heptane added to make a total volume of 50 ml. The catalyst is now ready for use.

Example IV.—The same general procedure is used as in Example I. However, the titanium powder is used directly without drying and venting the water vapor. Also the proportion of Ti to $TiCl_4$ is changed to 10 gms. of Ti powder (20% moisture added) and 121 gms. of $TiCl_4$. The product from this reduction is activated with $AlEt_3$ in the same manner as in Example III using an Al/Ti ratio of 2/1.

Example V.—The same general procedure is used as in Example I including the drying of the titanium powder. The proportions are 12.5 gms. of Ti powder (20% moisture) and 120 gms. of $TiCl_4$. The reduction is carried out at 490° C. The yield of product is 46% of theory. This product is activated in the same manner as in Example III using an Al/Ti ratio of 2/1.

Example VI.—Preformed $TiCl_3$ prepared as in Example I is activated with $AlEt_2Cl$ alone at an Al/Ti ratio of 2/1 using the general procedure of Example III. The polypropylene obtained is in the same molecular weight range, but the mechanical properties of the polymer are much different. The polymer has a lower tensile strength, a higher elongation and is a more flexible polymer.

Example VII.—Preformed $TiCl_3$ (0.5 gms.) prepared as in Example I is added to 250 ml. of n-heptane. A solution of 0.88 M $AlEt_3$ (7.2 ml.) in dry n-heptane is added and the mixture is made up to a total volume of 500 ml. with n-heptane. The Al/Ti ratio is 2. This catalyst is charged to a 3-liter autoclave after standing at room temperature for 30 minutes. An additional liter of n-heptane is added and this diluted catalyst slurry is allowed to stand at room temperature for an additional 30 minutes. At the end of this period 240 grams of cold liquid propylene is injected into the autoclave and the temperature increased to 80° C. The polymerization is complete in five hours.

Example VIII.—Repeat Example VII using an Al/Ti ratio of 0.5/1 and a total catalyst concentration of 1% on propylene.

Example IX.—Repeat Example VII using an Al/Ti ratio of 4/1 and a total catalyst concentration of 0.5% on propylene.

The major process data for Examples II–IX is summarized in the following table:

Summary table on polymerization of propylene

| Example | II | III | IV | V | VI | VII | VIII | IX |
|---|---|---|---|---|---|---|---|---|
| Catalyst: | | | | | | | | |
| Al Alkyl | AlEt$_3$ | {2/1 AlEt$_3$/AlEt$_2$Cl} | AlEt$_3$ | AlEt$_3$ | AlEt$_2$Cl | AlEt$_3$ | AlEt$_3$ | AlEt$_3$ |
| Al/Ti ratio | 2 | 2.5 | 2 | 2 | 2 | 2 | 0.5 | 4 |
| Concentration in heptane, gm./liter | 25 | 960 | 25 | 25 | 25 | 0.9 | 1.8 | 0.9 |
| Heptane Diluent, Percent | 22 | 10 | 22 | 22 | 22 | 80 | 80 | 80 |
| Reaction Conditions: | | | | | | | | |
| Time, hours | 20 | 40 | 20 | 20 | 20 | 5 | 3 | 3.5 |
| Temperature, °C | 84 | 80 | 84 | 84 | 84 | 77 | 80 | 80 |
| Pressure, p.s.i.g | 400–600 | 400–600 | 400–600 | 400–600 | 400–600 | 180–115 | 180–80 | 200–80 |
| Catalyst Efficiency: Gms./gm. catalyst | 111 | 64 | 144 | 114 | 125 | 123 | | 80 |
| Polymer: | | | | | | | | |
| Mol. wt.×10$^{-3}$ (Harris) | 113 | 82 | 115 | 98 | 145 | 145 | | 140 |
| Percent heptane insoluble | 79 | | 81 | 73 | 67 | 66 | 73 | |

NOTE.—AlEt$_3$ means Al triethyl; AlEt$_2$Cl means Al diethyl monochloride.

*Example X.*—TiCl$_3$, prepared as in Example I, and containing some free titanium, is ground to a powder with a mortar and pestle and 0.9 gram of this material is added directly to a 1-liter bomb in a dry nitrogen atmosphere. The last traces of powder are rinsed from the weighing bottle to the bomb with 10 ml. of dry n-heptane. An additional 235 ml. of dry n-heptane is added followed by 10 ml. of 0.876 MAl (C$_2$H$_5$)$_3$ in n-heptane and 5 ml. of 0.876 MAl (C$_2$H$_5$)$_2$Cl pipetted directly into the bomb. The bomb is sealed in the dry nitrogen atmosphere.

The bomb is placed in a rocker and connected to the 1-butene feed line. Approximately 250 grams of 1-butene (Matheson C.P.) is transferred to the feed reservoir which is cooled in a Dry Ice-isopropanol bath. The feed reservoir is pressured with 400 p.s.i.g. nitrogen pressure and the valve to the reactor opened. As soon as the 1-butene charge is in the reactor the rocker is started and the bomb is heated to 80° C. over a period of three hours. The pressure increases to a maximum of 520 p.s.i.g. After 40 hours at 80° C. the bomb is cooled. The off gas is measured at 10 liters and the bomb opened. The bomb is filled with a solid plug of violet poly-1-butene. The polymer is removed and added to a large excess of isopropanol which gradually decolorizes the material by reacting with the catalyst residue. The polymer is cut into small pieces and refluxed in isopropanol containing 20 ml. of acetylacetone for 16 hours. The polymer is then filtered and washed with isopropanol three times and methyl ethyl ketone three times. It is then dried in vacuo at 70° C. for 16 hours. The white product weighs 216.3 grams which gives a catalyst efficiency of 90 gms./gm. The conversion of 1-butene is essentially complete since the feed system has a hold-up of 30 ml. The calculated weight of the feed is 230 grams and the product isolated weighed 216 gms. This is a substantially quantitative yield within experimental error.

The product has a S.P./M.P. of 106–110° C. and two samples of the product have intrinsic viscosities of 2.6 and 3.3. These correspond to molecular weights (Harris) of 130,000 and 183,000 respectively. The highest molecular weight obtained previously with the TiCl$_4$—AlR$_3$ catalysts was 100,000, but this was obtained in low yield (3 gms./gm.). The highest yield obtained previously was 75 gm./gm. and this polymer had a molecular weight of only 50,000.

Ether extraction of this higher molecular weight product gave 77% insoluble material compared to 64% for the 50,000 molecular weight material mentioned above. Thus the poly-1-butene is a more crystalline product.

Thus the novel catalyst described above results in the production of a crystalline poly-1-butene of desirable very high molecular weight and with good catalyst efficiency. Thus the Harris obtained in Example X was 130,000 to 183,000 compared to a relatively poorer molecular weight of 30,000 obtained by polymerization of 1-butene under somewhat similar conditions but using a catalyst based on a plain TiCl$_3$ and not containing any free titanium, and made by an unknown process. The catalyst efficiency obtained in Example X of the present invention was 90 grams of polymer per gram of catalyst compared to only 1.7 grams of polymer per gram of catalyst in the other process just referred to which produced a poly-1-butene of only 30,000 molecular weight.

Another point of superiority of the poly-1-butene made with the catalyst of the present invention, is its low unsaturation. For instance the product made in Example X, which had a Harris molecular weight of 80,000 had the very low unsaturation cts. of iodine per gram; whereas a poly-1-butene made by a fairly similar polymerization process except using as catalyst TiCl$_3$ activated with diethyl aluminum monochloride, and which had a Harris molecular weight of about 30,000, had a very much higher unsaturation of 6.61 cts. of iodine per gram.

*Additional examples, without experimental confirmation*

*Example XI.*—Preparation of ZrCl$_3$ from ZrCl$_4$ and Zr (powder) using the general technique of Example I. The reaction should be carried out at about 600° C. to obtain good yield.

*Example XII.*—Activation of ZrCl$_3$ by the method of Example II.

*Example XIII.*—Preparation of ZrCl$_3$—TiCl$_3$ mixture using ZrCl$_4$ plus Ti at 600° C. using general technique of Example I.

*Example XIV.*—Preparation of ZrCl$_3$—TiCl$_3$ mixture using TiCl$_4$ plus Zr at 500° C. using general technique of Example II.

These combinations could be varied to include examples of:

(1) Various metals with each metal halide;
(2) Mixtures of metals and/or metal halides;
(3) Activation of each reduction product with various AlR$_3$ or other metal alkyls;
(4) Polymerizations using such catalysts at various catalyst concentrations, propylene/heptane ratios and Al/Ti ratios.

Some of the more pertinent examples are listed hereinbelow.

*Example XV.*—Preparation of VCl$_3$ from VCl$_5$ and/or VCl$_4$ plus V, Ti etc. at a temperature in the range 400 to 600° C.

*Example XVI.*—Preparation of HfCl$_3$ from HfCl$_4$ plus Hf at 600° C.

*Example XVII.*—Preparation of MoCl$_3$ from MoCl$_5$ plus Mo, Ti etc. at a temperature in the range 400 to 600° C.

It is not intended that the invention be limited to the above specific examples of materials and reaction conditions, but only by the appended claims in which it is intended to claim all novelty inherent in the invention, as well as all modifications coming within the scope and spirit of the invention.

What is claimed is:

1. A catalyst comprising a major proportion of violet crystalline $TiCl_3$, and intimately associated therewith about 1–50% by weight of Ti.

2. The catalyst of claim 1 which contains from 5 to 25% by wt. of titanium.

3. The catalyst of claim 2 which contains an aluminum alkyl compound in amount sufficient to give an Al/Ti molar ratio of 0.1 to 10.0.

4. A catalyst comprising about 85% by weight of violet crystalline $TiCl_3$ and about 15% by weight of Ti, intimately associated therewith.

5. A method of making a catalyst which comprises reducing $TiCl_4$ with finely divided titanium at a temperature of 350–600° C. and a pressure of 5–100 atmospheres to obtain a product comprising a major proportion of violet crystalline $TiCl_3$ containing about 5–25% of metallic titanium intimately associated therewith.

6. A method of preparing an improved catalyst which comprises reducing 3 mols of $TiCl_4$ with 0.5 to 2.0 mols of powdered Ti at a temperature of about 400–500° C. under a pressure of about 5–100 atmospheres, to obtain a solid product comprising a major proportion of violet crystalline $TiCl_3$ having a minor amount of elemental Ti intimately associated therewith, pulverizing the resultant product, suspending it in inert organic liquid and adding thereto a solution of an alkyl aluminum compound.

7. A method of making a catalyst which comprises reducing $TiCl_4$ with finely divided titanium at a temperature of 350 to 600° C. to obtain a product comprising a major proportion of violet crystalline $TiCl_3$ containing from 1 to 50% of metallic titanium intimately associated therewith.

References Cited in the file of this patent

UNITED STATES PATENTS

| | | |
|---|---|---|
| 2,439,765 | Walker et al. | Apr. 13, 1948 |
| 2,670,270 | Jordan | Feb. 23, 1954 |
| 2,694,652 | Loonam | Nov. 16, 1954 |
| 2,706,153 | Glasser | Apr. 12, 1955 |
| 2,707,706 | Bauch | May 3, 1955 |
| 2,720,445 | Ruchrwein et al. | Oct. 11, 1955 |
| 2,721,189 | Anderson et al. | Oct. 18, 1955 |

OTHER REFERENCES

J. Organic Chem., vol. 10 of 1945, pages 505–515.